(12) United States Patent
Hirata

(10) Patent No.: US 12,482,358 B2
(45) Date of Patent: Nov. 25, 2025

(54) PARKING LOT MANAGEMENT APPARATUS, PARKING LOT MANAGEMENT METHOD, AND NON-TRANSITORY COMPUTER READABLE MEDIUM

(71) Applicant: NEC Corporation, Tokyo (JP)

(72) Inventor: Masayasu Hirata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 128 days.

(21) Appl. No.: 18/281,439

(22) PCT Filed: Jan. 31, 2022

(86) PCT No.: PCT/JP2022/003601
§ 371 (c)(1),
(2) Date: Sep. 11, 2023

(87) PCT Pub. No.: WO2022/196136
PCT Pub. Date: Sep. 22, 2022

(65) Prior Publication Data
US 2024/0153386 A1     May 9, 2024

(30) Foreign Application Priority Data
Mar. 16, 2021   (JP) .................................. 2021-042935

(51) Int. Cl.
*G08G 1/14*   (2006.01)
*G06T 7/70*   (2017.01)
*G06V 20/52*  (2022.01)

(52) U.S. Cl.
CPC ............... *G08G 1/148* (2013.01); *G06T 7/70* (2017.01); *G06V 20/52* (2022.01); *G08G 1/143* (2013.01);
(Continued)

(58) Field of Classification Search
CPC ........ G08G 1/148; G08G 1/143; G08G 1/142; G08G 1/14; G08G 1/144; G08G 1/146;
(Continued)

(56) References Cited

U.S. PATENT DOCUMENTS

2019/0063947 A1*  2/2019  Beaurepaire ....... G01C 21/3423
2020/0098196 A1*  3/2020  Bruce ...................... G08G 1/04

FOREIGN PATENT DOCUMENTS

JP    2006-275738 A    10/2006
JP    2010-117864 A     5/2010
(Continued)

OTHER PUBLICATIONS

International Search Report for PCT Application No. PCT/JP2022/003601, mailed on Apr. 19, 2022.

*Primary Examiner* — Daryl C Pope
(74) *Attorney, Agent, or Firm* — Sughrue Mion, PLLC

(57) ABSTRACT

A parking lot management apparatus according to the present disclosure includes: a parking lot management unit configured to manage a use status of a parking lot in a facility; a user information management unit configured to associate facility use information of a user who uses the facility with a vehicle number of a vehicle used by the user and manage the associated information; a detection unit configured to detect a first vehicle number of a first vehicle moving in the parking lot; and a determination unit configured to determine, from among a plurality of parking positions that are not currently being used, a parking position of the first vehicle based on the facility use information associated with the first vehicle number so that a moving distance of the user moving in the facility is reduced.

9 Claims, 10 Drawing Sheets

(52) U.S. Cl.
CPC ............... *G06T 2207/30232* (2013.01); *G06T 2207/30252* (2013.01); *G06V 2201/08* (2022.01)

(58) Field of Classification Search
CPC ............. G06T 7/70; G06T 2207/30232; G06T 2207/30252; G06V 20/52; G06V 2201/08; G06Q 50/10; G07B 15/00
See application file for complete search history.

(56) References Cited

FOREIGN PATENT DOCUMENTS

| | | |
|---|---|---|
| JP | 2012-208833 A | 10/2012 |
| WO | 2006/109828 A1 | 10/2006 |
| WO | 2020/079794 A1 | 4/2020 |

\* cited by examiner

| PARKING POSITION | USE STATUS | VEHICLE NUMBER |
|---|---|---|
| A-1 | AVAILABLE | |
| A-2 | BEING USED | 99-99 |
| A-3 | BEING USED | 88-88 |
| A-4 | AVAILABLE | |
| A-5 | BEING USED | 77-77 |

⋮

| | | |
|---|---|---|
| F-1 | AVAILABLE | |
| F-2 | AVAILABLE | |
| F-3 | AVAILABLE | |
| F-4 | BEING USED | 66-66 |
| F-5 | AVAILABLE | |

Fig. 5

| VEHICLE NUMBER | SCHEDULED RENTAL DATE AND TIME | TYPE OF VEHICLE | NUMBER OF USERS | OPTIONAL ITEM |
|---|---|---|---|---|
| 00-01 | 10:30 | aaa | FOUR | CAR NAVIGATION SYSTEM |
| 01-01 | 13:30 | bbb | TWO | NONE |
| 11-01 | 17:30 | ccc | SEVEN | CHILD SEAT |

PARKING LOT MANAGEMENT APPARATUS, PARKING LOT MANAGEMENT METHOD, AND NON-TRANSITORY COMPUTER READABLE MEDIUM

This application is a National Stage Entry of PCT/JP2022/003601 filed on Jan. 31, 2022, which claims priority from Japanese Patent Application 2021-042935 filed on Mar. 16, 2021, the contents of all of which are incorporated herein by reference, in their entirety.

TECHNICAL FIELD

The present disclosure relates to a parking lot management apparatus, a parking lot management method, and a program.

BACKGROUND ART

In recent years, systems for smoothly guiding vehicles entering a parking lot to parking positions have been provided in large commercial facilities. Patent Literature 1 discloses a configuration of a parking lot information provision system that searches for a route to a parking position candidate indicating an available parking space in a parking lot and determines a recommended parking position. Patent Literature 1 discloses that, when a recommended parking position is determined, a parking position located on the route having a small number of vehicles travelling is determined as a recommended parking position among a plurality of candidate parking positions.

CITATION LIST

Patent Literature

Patent Literature 1: Japanese Unexamined Patent Application Publication No. 2010-117864

SUMMARY OF INVENTION

Technical Problem

When the parking lot information provision system disclosed in Patent Literature 1 is used, a recommended parking position is determined in accordance with a congestion state in the parking lot. However, in the parking lot information provision system disclosed in Patent Literature 1, a flow line of a user moving from the parking position to a facility or moving toward the parking position in order to move to the outside of the facility is not taken into account. Therefore, there is a problem that the parking lot information provision system disclosed in Patent Literature 1 cannot provide a service in which a flow line of a user is taken into account.

The present disclosure has been made in view of the above-described problem and an object thereof is to provide a parking lot management apparatus, a parking lot management method, and a program that are capable of improving the degree of satisfaction of a user who uses a parking lot.

Solution to Problem

A parking lot management apparatus according to a first example aspect of the present disclosure includes: a parking lot management unit configured to manage a use status of a parking lot in a facility; a user information management unit configured to associate facility use information of a user who uses the facility with a vehicle number of a vehicle used by the user and manage the associated information; a detection unit configured to detect a first vehicle number of a first vehicle moving in the parking lot; and a determination unit configured to determine, from among a plurality of parking positions that are not currently being used, a parking position of the first vehicle based on the facility use information associated with the first vehicle number so that a moving distance of the user moving in the facility is reduced.

A parking lot management method according to a second example aspect of the present disclosure includes: managing a use status of a parking lot in a facility; associating facility use information of a user who uses the facility with a vehicle number of a vehicle used by the user and managing the associated information; detecting a first vehicle number of a first vehicle moving in the parking lot; and determining, from among a plurality of parking positions that are not currently being used, a parking position of the first vehicle based on the facility use information associated with the first vehicle number so that a moving distance of the user moving in the facility is reduced.

A program according to a third example aspect of the present disclosure causes a computer to: manage a use status of a parking lot in a facility; associate facility use information of a user who uses the facility with a vehicle number of a vehicle used by the user and manage the associated information; detect a first vehicle number of a first vehicle moving in the parking lot; and determine, from among a plurality of parking positions that are not currently being used, a parking position of the first vehicle based on the facility use information associated with the first vehicle number so that a moving distance of the user moving in the facility is reduced.

Advantageous Effects of Invention

According to the present disclosure, it is possible to provide a parking lot management apparatus, a parking lot management method, and a program that are capable of improving the degree of satisfaction of a user who uses a parking lot.

BRIEF DESCRIPTION OF DRAWINGS

FIG. 5 is a diagram showing a parking position database according to the second example embodiment;

FIG. 6 is a diagram showing a user information management database according to the second example embodiment;

EXAMPLE EMBODIMENT

First Example Embodiment

Figure 1:
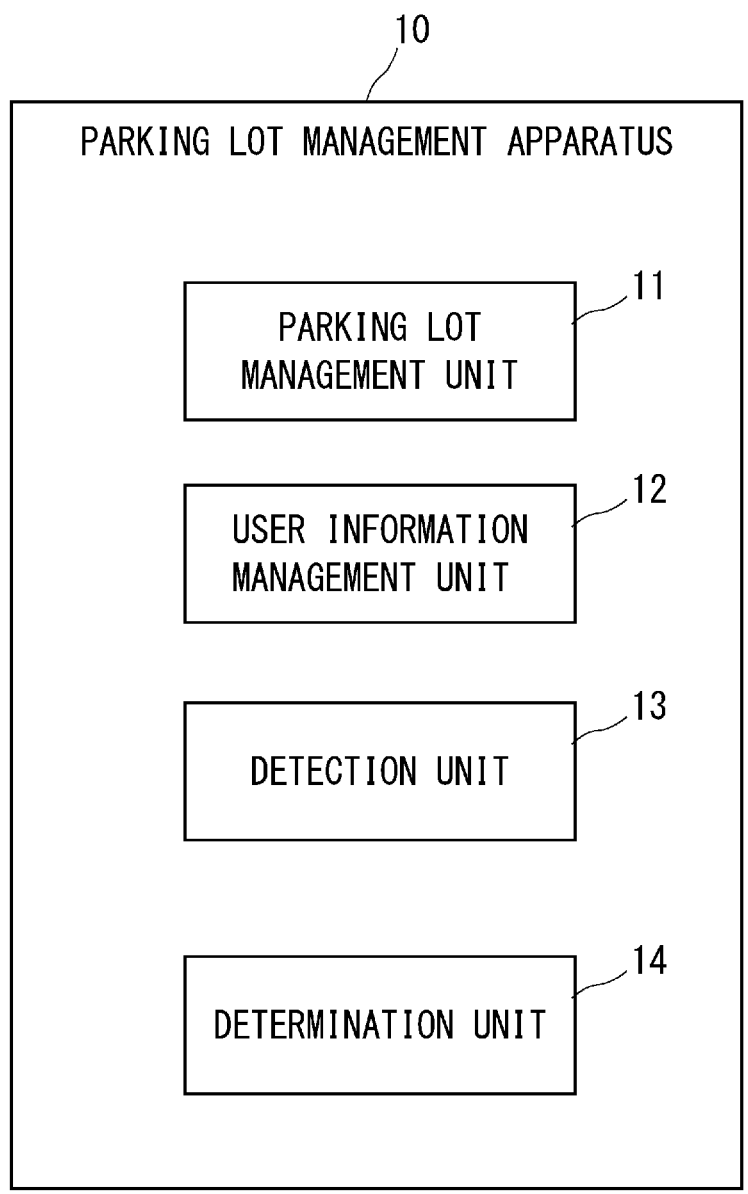
FIG. 1 is a configuration diagram of a parking lot management apparatus according to a first example embodiment.

Example embodiments of the present disclosure will be described hereinafter with reference to the drawings. An example of a configuration of a parking lot management apparatus 10 according to a first example embodiment will be described with reference to FIG. 1. The parking lot management apparatus 10 may be a computer apparatus operated by a processor executing a program stored in a memory. The parking lot management apparatus 10 may be, for example, a server apparatus.

The parking lot management apparatus 10 includes a parking lot management unit 11, a user information management unit 12, a detection unit 13, and a determination unit 14. The components of the parking lot management apparatus 10, such as the parking lot management unit 11, the user information management unit 12, the detection unit 13, and the determination unit 14, may be software or modules by which processing is performed by a processor executing a program stored in a memory. Alternatively, the components of the parking lot management apparatus 10 may be hardware such as circuits or chips.

The parking lot management unit 11 manages a use status of a parking lot at a facility. The facility may be a commercial facility, such as a supermarket, a shopping center, a rental car place, or a stadium where events are held. Alternatively, the facility may be a business facility, such as a business office, a research laboratory, or the like with a parking lot. A parking lot in the facility may be a parking lot provided in the same building as the facility, or a parking lot provided in an area adjacent to the facility.

The use status may be, for example, a use rate of the entire parking lot, whether or not a parking position is available, the number of available parking spaces per area including a plurality of parking positions, and the like. An available space is a space that can be parked in. Further, the use status may include a reservation status of each parking position. That is, a space that is currently available but has been reserved may be regarded as being a space that cannot be parked in.

The user information management unit 12 associates facility use information of a user who uses the facility with the number of the vehicle used by the user and manages it. The user who uses the facility may be a user who visits a store in the facility or a user who visits the facility in order to receive services provided by the facility. The services provided by the facility may be, for example, services related to the rental of vehicles at a rental car place.

For example, in a rental car place, the facility use information may be information indicating the type of a vehicle which a user wants to rent, the period of use of a vehicle including a scheduled rental date and time and a scheduled return date and time, the number of people riding in the vehicle, optional items, and the like. Alternatively, the facility use information may be the name of a store to be used when a plurality of stores are included in the facility. For example, in a rental car place, the user information management unit 12 may associate the vehicle number of the vehicle that is determined based on advanced reservation information from a user with the facility use information and manage it. The facility use information may be information which a user sends to a rental car place as advanced reservation information. The rental car place may receive the advanced reservation information online.

Alternatively, before a user visits a large shopping center, the vehicle number of the vehicle in which the user rides and the store which the user intends to visit may be registered online in advance at a reservation center or the like operated by the large shopping center. Specifically, when a user uses a movie theater in the large shopping center, the vehicle number of the vehicle may be registered in advance along with the purchase of a ticket. Alternatively, when a user purchases a ticket in advance and visits a stadium where a sports game is held, the user may register the vehicle number of the vehicle along with the purchase of the ticket.

The detection unit 13 detects a first vehicle number of a first vehicle moving in the parking lot. For example, the detection unit 13 may detect the vehicle number by analyzing a captured image captured by a camera installed in the parking lot. Alternatively, a Radio Frequency IDentification (RFID) tag reader installed in the parking lot may read information including the vehicle number from the RFID tag installed in the vehicle. The detection unit 13 may recognize the vehicle number by acquiring information including the vehicle number output from the RFID tag reader. Alternatively, when a two-dimensional code is attached to the vehicle, the reader may read the two-dimensional code and the detection unit 13 may recognize the vehicle number by acquiring information including the vehicle number output from the reader. Alternatively, the detection unit 13 may receive information transmitted using a Data Communication Module (DCM) for external communication installed in the vehicle. The vehicle number may be included in information received by the detection unit 13 through the DCM.

The determination unit 14 determines, from among a plurality of parking positions that are not currently being used, a parking position of the first vehicle based on the facility use information associated with the first vehicle number so that a moving distance of a user moving in the facility is reduced. For example, in a rental car place, when the facility use information satisfies a predetermined standard, the determination unit 14 may determine, as a parking position, a place near the place where a user is carrying out the rental procedure. Specifically, in a rental car place, when the facility use information indicates that the first vehicle is scheduled to be rented on that day, the determination unit 14 may determine, as a parking position, a place near the place where a user is carrying out the rental procedure. Alternatively, in a commercial facility, the determination unit 14 may determine, as a parking position, a parking space on the same floor as the store visited by a user indicated in the facility use information. Alternatively, in a stadium, when the facility use information indicates the team cheered by a user, the determination unit 14 may determine, as a parking position, a parking space near the seats for the team cheered by the user.

As described above, the parking lot management apparatus 10 can detect a vehicle moving in the parking lot and determine a parking position so that a moving distance of a user who uses this vehicle is reduced. By determining a parking position while taking the flow line of a user into account in this way, the degree of satisfaction of the user when the user who uses the facility can be improved as compared with a case in which an available position is determined as a parking position for the vehicle.

Second Example Embodiment

Figure 2:
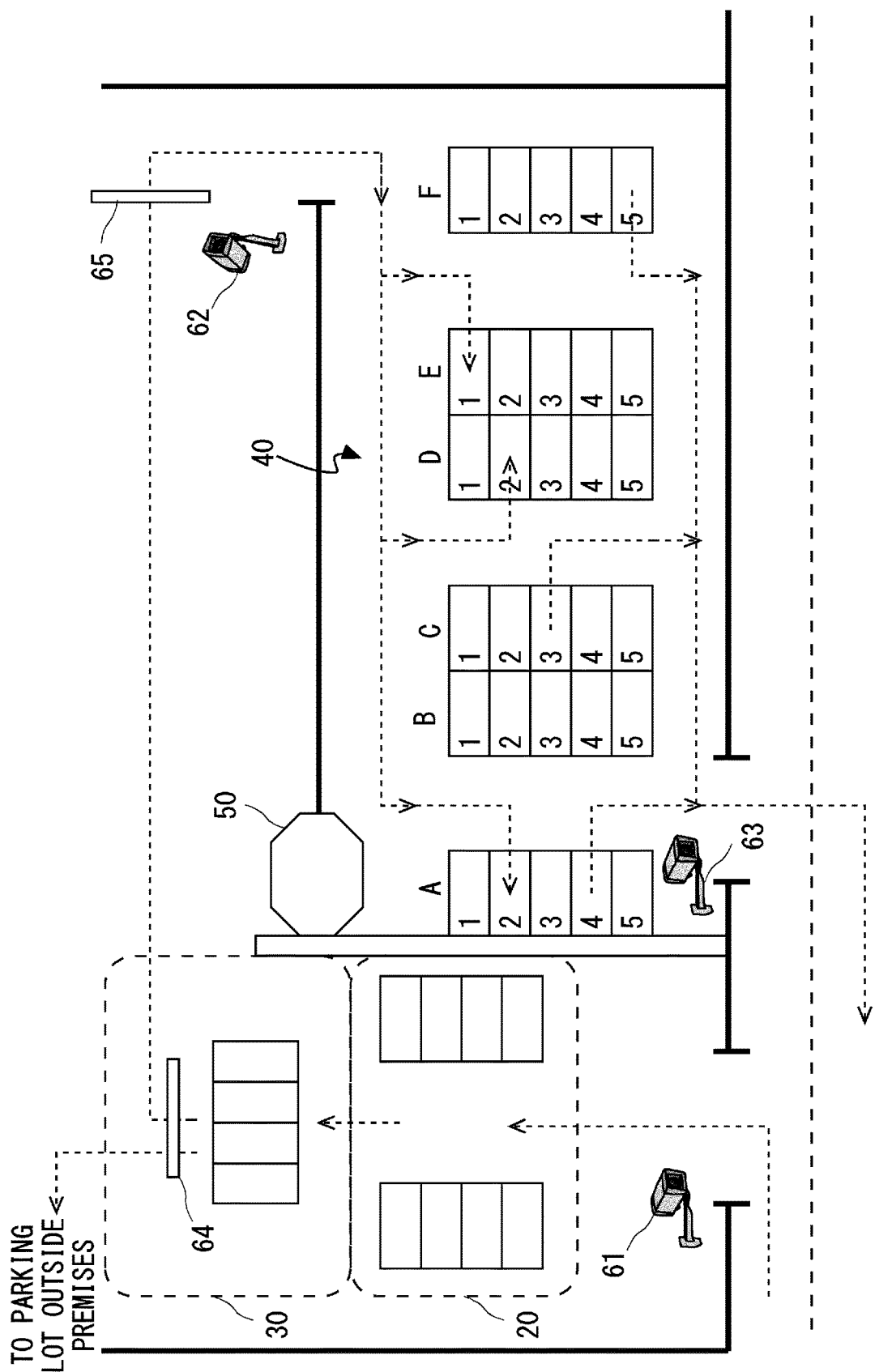
FIG. 2 is a diagram showing a service image in a rental car place according to a second example embodiment.

Next, as an example, a service image in a rental car place will be described with reference to FIG. 2. FIG. 2 shows the premises of the rental car place and a road adjacent to the premises of the rental car place. The premises of the rental car place include a car wash space 20, a standby space 30, a parking space 40, and a procedure office 50. Further, a parking space may be provided outside the premises in addition to the parking space 40. In the parking spaces outside the premises, for example, vehicles that are not scheduled to be rented for a specified period or longer may be parked.

The car wash space 20 is a space for washing returned vehicles. A user returns a vehicle to, for example, the car wash space 20 or a space near the car wash space 20. The standby space 30 is a space where vehicles that have been washed are temporarily parked in. A staff member of the car rental place moves the vehicle parked in the standby space 30 to a parking space outside the premises or to the parking space 40. The parking space 40 is a space where vehicles to be rented to users are parked in. After a user has completed the rental procedure at the procedure office 50, a vehicle to be rented is assigned to the user. The user moves to the parking position of the assigned vehicle in the parking space 40 on foot. In the parking space 40, there are rows A to F of parking positions. The row A is closest to the procedure office 50 and the row F is furthest from the procedure office 50.

Dotted-line arrows in FIG. 2 show the flow lines of vehicles. For example, a returned vehicle moves to the standby space 30 via the car wash space 20. Further, the vehicle moves to the parking space outside the premises or to the parking space 40. Then, the vehicle is parked in one of the parking positions in the rows of A to F. After that, a user gets in the vehicle and drives outside the premises of the rental car place.

A camera 61 is a camera that monitors and captures an image of the vehicle that has returned to the rental car place. That is, the camera 61 is a camera that captures an image of the vehicle to be returned to the rental car place. A camera 62 is a camera that monitors and captures an image of the vehicle entering the parking space 40. A camera 63 is a camera that monitors and captures an image of the vehicle that departs from the rental car place. A user who has completed the rental procedure of a vehicle at the procedure office 50 is riding in the vehicle that departs from the rental car place.

A destination of the vehicle moving from the standby space 30 is displayed on a display apparatus 64. For example, the parking lot outside the premises or the parking space 40 may be displayed on the display apparatus 64 as the destination of the vehicle moving from the standby space 30. A display apparatus 65 displays a parking position of a vehicle in the parking space 40. For example, the display apparatus 65 shows parking positions of A-2, D-2, etc. Each of the display apparatuses 64 and 65 may be, for example, a liquid crystal display, an organic Electro Luminescence (EL) display, an electric bulletin board, or the like. The display apparatuses 64 and 65 may be installed so that they are hung from the ceiling located above the flow line of the vehicle. By doing so, a driver of the vehicle can visually recognize the display apparatuses 64 and 65.

Figure 3:
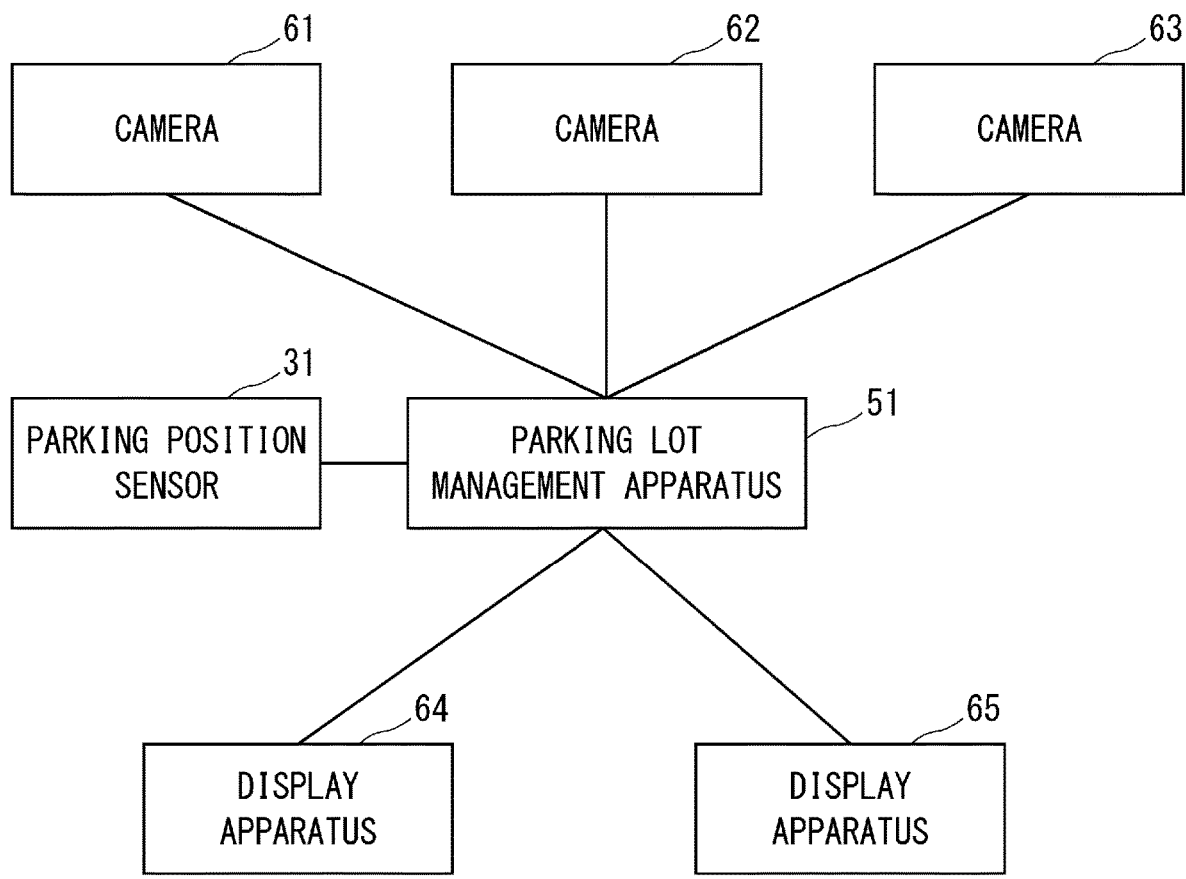
FIG. 3 is a diagram showing a configuration diagram of a parking lot management system according to the second example embodiment.

Next, an example of a configuration of a parking lot management system according to the first example embodiment will be described with reference to FIG. 3. The parking lot management system includes a parking position sensor 31, a parking lot management apparatus 51, the cameras 61 to 63, and the display apparatuses 64 and 65. The parking lot management apparatus 51 may be connected to the parking position sensor 31, the cameras 61 to 63, and the display apparatuses 64 and 65 through a network. The parking position sensor 31, the cameras 61 to 63, and the display apparatuses 64 and 65 may be connected to the network via a wireless or a wired communication line.

The parking position sensor 31 may be installed, for example, for each parking position in the standby space 30. For example, the parking position sensor 31 may acquire the vehicle number of the vehicle parked in the parking position using Bluetooth (Registered Trademark) or the like, or it may acquire the vehicle number from an RFID tag installed in the vehicle. Further, the parking position sensor 31 may detect that the parked vehicle has departed, and notify the parking lot management apparatus 51 about the departing of the vehicle and its vehicle number. For example, a weight sensor, a temperature sensor, an infrared sensor, and the like may be used to detect the departing of the vehicle.

Further, instead of the parking position sensor 31, a camera may be installed in a position where the standby space 30 is monitored. The camera may transmit a captured image to the parking lot management apparatus 51, and the parking lot management apparatus 51 may identify the vehicle number of the departed vehicle by analyzing the captured image.

When the parking lot management apparatus 51 has identified the departed vehicle by using information detected by the parking position sensor 31 or the images captured by the cameras, it transmits information indicating whether this vehicle is headed for a parking space outside the premises or the parking space 40 to the display apparatus 64. The display apparatus 64 displays the received information.

The camera 62 captures an image of the vicinity of the entrance to the parking space 40 and transmits the captured image to the parking lot management apparatus 51. When the parking lot management apparatus 51 has identified the vehicle number by analyzing the captured image, the parking lot management apparatus 51 transmits the parking position of the vehicle having this vehicle number in the parking space 40 to the display apparatus 65. The display apparatus 65 displays the received information. The parking lot management apparatus 51 may identify the vehicle number by determining the number shown on the license plate of the vehicle using common image recognition techniques.

The camera 63 captures an image of the vicinity of the exit of the parking space 40 and transmits the captured image to the parking lot management apparatus 51. When the parking lot management apparatus 51 has identified the vehicle number by analyzing the captured image, the parking lot management apparatus 51 determines that the parking position where the vehicle having this vehicle number has been parked has become available.

The camera 61 captures an image of the vicinity of the entrance of the rental car place where the vehicle that has been rented enters, and transmits the captured image to the parking lot management apparatus 51. When the parking lot management apparatus 51 has identified the vehicle number by analyzing the captured image, the parking lot management apparatus 51 determines that the vehicle that has been rented has been returned.

Figure 4:
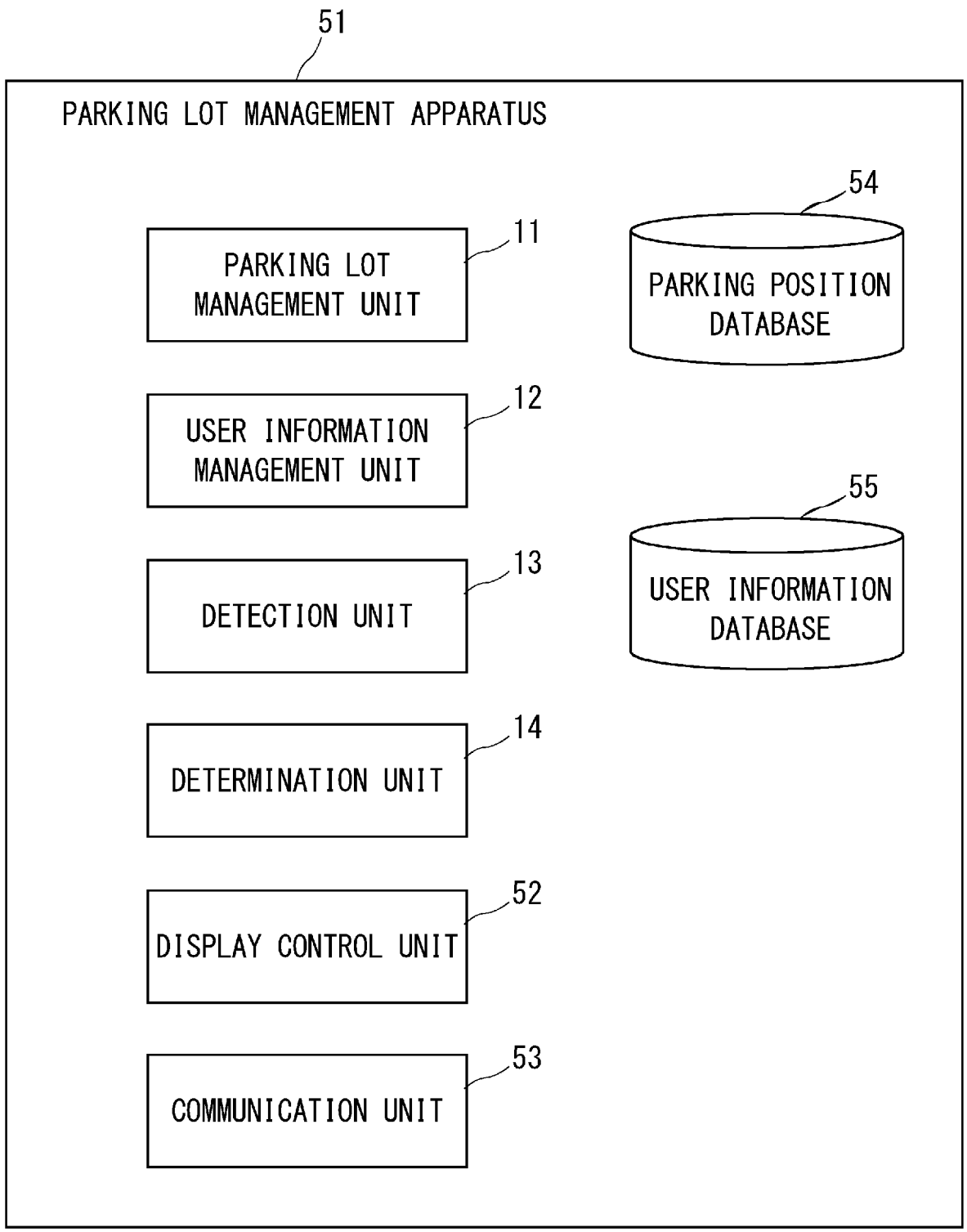
FIG. 4 is a diagram showing a configuration diagram of a parking lot management apparatus according to the second example embodiment.

Next, an example of a configuration of the parking lot management apparatus 51 according to the second example embodiment will be described with reference to FIG. 4. The configuration of the parking lot management apparatus 51 is the same as that of the parking lot management apparatus 10 except for the addition of a display control unit 52, a communication unit 53, a parking position database 54, and a user information database 55. In the following description, the features of the configuration of the parking lot management apparatus 51 that are different from those of the parking lot management apparatus 10 are focused on.

The communication unit 53 communicates with the parking position sensor 31, the camera 61 to 63, and the display apparatuses 64 and 65 through the network to transmit and receive data. Alternatively, the communication unit 53 may communicate with various types of sensors installed in the premises of the rental car place through the network. For example, sensors for recognizing moving vehicles may be installed in the premises of the rental car place on the flow lines of the vehicles. The sensors for recognizing vehicles may be, for example, RFID tag readers, infrared sensors, etc.

The parking lot management unit 11 manages a use status of each parking position using the parking position database 54 shown in FIG. 5. The parking position database 54 associates the parking position in the parking space 40 with information indicating whether this parking position is available or being used. Further, the parking position database 54 associates the vehicle number of the vehicle using the parking position with the above information. For example, the parking position database 54 in FIG. 5 shows that the vehicle having the vehicle number 99-99 is using the parking position A-2.

The user information management unit 12, using the user information database 55 shown in FIG. 6, associates the vehicle number of the vehicle to be rented to a user with information about the scheduled rental date and time, the type of the vehicle, the number of users, and optional items, and manages it. The scheduled rental date and time is the time when the rental of a vehicle to a user is started. Alternatively, the scheduled rental date and time may be the time when a user arrives at the rental car place. The type of the vehicle is that of the vehicle indicated by the vehicle number. The type of the vehicle may be that of the vehicle which a user wants to rent. The number of users is the number of people riding in the vehicle. The optional items are accessories which a user wants to use. FIG. 6 shows, for example, a car navigation system and a child seat as optional items. However, optional items are not limited thereto. The information about the scheduled rental date and time, the type of the vehicle, the number of users, and optional items corresponds to facility use information.

For example, when a reservation regarding the rental of a vehicle is received from a user, a staff member of the rental car place determines a vehicle to be rented to the user. Further, the staff member inputs the vehicle number of the determined vehicle and information about the scheduled rental date and time, the type of the vehicle, the number of users, and optional items, which information the user has informed the staff member of, to the user information database 55. Alternatively, when a user inputs information about the scheduled rental date and time, the type of the vehicle, the number of users, and optional items online, a vehicle may be determined autonomously by a tool or the like that determines a vehicle in accordance with the information input by the user. In this case, the staff member may not input the above information to the user information database 55, and the vehicle number of the determined vehicle and the information input by a user may be automatically reflected in the user information database 55.

The detection unit 13 receives, from the parking position sensor 31, information including the departing of the vehicle from the parking position and its vehicle number. Alternatively, the detection unit 13 receives the captured image from a camera that captures the standby space 30, and detects or identifies the vehicle number of the vehicle that has departed from the parking position of the standby space 30 by analyzing the captured image.

Further, the detection unit 13 detects the vehicle number of the vehicle to be returned by analyzing the captured image received from the camera 61. The detection unit 13 also detects the vehicle number of the vehicle entering the parking space 40 by analyzing the captured image received from the camera 62. The detection unit 13 also detects the vehicle number of the vehicle that departs from the parking space 40 by analyzing the captured image received from the camera 63.

The determination unit 14 extracts facility use information associated with the vehicle number detected by the detection unit 13 from the user information database 55. Further, the determination unit 14 determines a parking position of the vehicle having the vehicle number detected by the detection unit 13 by using the facility use information and the parking position database 54.

Processing for determining a parking position of a vehicle performed by the determination unit 14 will be described below. For example, the determination unit 14 determines that the vehicle number detected by the detection unit 13 is the vehicle number associated with the scheduled rental date and time closest to the current time among the vehicle numbers managed in the user information database 55. In this case, the determination unit 14 may determine an available space nearest to the procedure office 50 as a parking position of the vehicle having this vehicle number. Further, the determination unit 14 may determine, from among available spaces, the available space which is the second nearest one to the procedure office 50 as a parking position of the vehicle having the vehicle number associated with the rental date and time which is the second closest to the current time. As described above, as the scheduled rental date and time becomes closer to the current time, the distance from the procedure office 50 to the parking position may be reduced.

As another example of the processing for determining a parking position, for example, the determination unit 14 determines that the vehicle number detected by the detection unit 13 is the vehicle number associated with the largest number of users among the vehicle numbers managed in the user information database 55. In this case, the determination unit 14 may determine an available space nearest to the procedure office 50 as a parking position of the vehicle having this vehicle number. Further, the determination unit 14 may determine, from among available spaces, the available space which is the second nearest one to the procedure office 50 as a parking position of the vehicle having the vehicle number associated with the second largest number of users. As described above, as the number of users increases, the distance from the procedure office 50 to the parking position may be reduced.

As another example of the processing for determining a parking position, for example, the determination unit 14 determines that the vehicle number detected by the detection unit 13 is the vehicle number associated with the optional items including a child seat among the vehicle numbers managed in the user information database 55. In this case, the determination unit 14 may determine an available space nearest to the procedure office 50 as a parking position of the vehicle having this vehicle number. As described above, when the optional items include equipment used by small children, the determination unit 14 may determine a parking position near the procedure office 50 in order to reduce the moving distance of a user. When there are a plurality of optional items, priorities may be assigned to the optional items, and an available space near the procedure office 50 may be assigned to the vehicle in a descending order of priorities.

Further, in the processing for determining a parking position, the determination unit 14 may predetermine the priority of each item such as the scheduled rental date and time, the number of users, and the optional items. In this case, the determination unit 14 determines a parking position by using the item having the highest priority, and when the contents set in the item having the highest priority are the same, the determination unit 14 determines a parking position by using the item having the second highest priority.

Alternatively, the determination unit 14 may score each item based on the registered contents and assign a parking position of an available space near the procedure office 50 in a descending order of the total scores. For example, for the item of the scheduled rental date and time, the highest score may be set in the scheduled rental date and time closest to the current time, and the score may be reduced as the time between the scheduled rental date and time and the current time increases. Further, for the item of the number of users, the highest score may be set in the largest number of users, and the score may be reduced as the number of users is reduced. For the optional items, the score may be set in advance for each optional item which a rental car place can provide.

Further, when the vehicle number detected by the detection unit 13 is not registered in the user information database 55, the determination unit 14 may use a parking space outside the premises as a parking position.

Further, the determination unit 14 may determine a parking position by using climate information. For example, when rain, snow, strong winds, or the like are forecast, the determination unit 14 may determine a parking position of each vehicle so that the number of vehicles to be moved outside the premises is reduced.

Further, in a case in which the parking lot is congested, the determination unit 14 may determine an available space located away from the procedure office 50 as a parking position in the parking space 40. The case in which the parking lot is congested may be, for example, a case in which there are users who are waiting to rent vehicles in the parking space 40 or a case in which there are users who are carrying out the rental procedure in the procedure office 50. For example, an administrator or the like who manages the parking lot management apparatus 51 may input to the parking lot management apparatus 51 the number of users who are carrying out the rental procedure and the number of users who are waiting to rent vehicles after the rental procedure is completed. The determination unit 14 may determine that the parking lot is congested when either the number of users who are carrying out the rental procedure and the number of users who are waiting to rent vehicles after the rental procedure is completed exceeds a predetermined value.

Further, the determination unit 14 may determine a parking position based on the type of the vehicle associated with the vehicle number detected by the detection unit 13. Specifically, the determination unit 14 may determine a parking position so that specific types of the vehicles are parked so as to be concentrated in the same area. For example, the determination unit 14 may determine a parking position so that specific types of the vehicles are concentrated in one of the rows A to F.

The determination unit 14 may perform machine learning by accumulating results of the processing for determining a parking position and reference information used for the processing for determining a parking position, and determine a parking position in accordance with a learning model obtained by the machine learning.

Among the parking positions managed in the parking position database 54, the parking lot management unit 11 may update the parking position where the determination unit 14 has determined that a vehicle is to be parked to a parking position that is being used. Further, when the detection unit 13 detects the vehicle number of a vehicle that departs from the parking space 40, the parking lot management unit 11 may update the parking position used by the detected vehicle to an available space in the parking position database 54.

Alternatively, when a camera that monitors the parking space 40 is installed, the parking lot management unit 11 may periodically analyze images captured by the camera, identify the use status of each parking position, and update the parking position database 54.

The display control unit 52 transmits information about the parking position determined by the determination unit 14 to the display apparatuses 64 and 65 visually recognized by a driver of the vehicle having the vehicle number detected by the detection unit 13, and causes the display apparatuses 64 and 65 to display the information. When the parking position is one of the parking positions in the rows A to F of the parking space 40, the display control unit 52 may cause the display apparatus 64 to display the parking space 40 as a destination. When the parking position is outside the premises, the display control unit 52 may cause the display apparatus 64 to display that the destination is outside the premises.

Further, the display control unit 52 causes the display apparatus 65 to display one of the parking positions in the rows A to F of the parking space 40. That is, the display control unit 52 may cause the display apparatus 64 to display a content different from that displayed by the display apparatus 65.

When the detection unit 13 detects the vehicle number of the vehicle that has departed from the parking position of the standby space 30, the display control unit 52 transmits information about the parking position of this vehicle to the display apparatus 64. Further, when the detection unit 13 detects the vehicle number of the vehicle entering the parking space 40 by analyzing the captured image received from the camera 62, the display control unit 52 transmits information about the parking position of this vehicle to the display apparatus 65.

Alternatively, when the detection unit 13 detects the vehicle number of the vehicle that has departed from the parking position of the standby space 30, the display control unit 52 may calculate a timing when the vehicle approaches the display apparatus 65 by taking into account the moving speed of the vehicle and the distance from the display apparatus 64 to the display apparatus 65. In this case, the communication unit 53 may transmit information about the parking position of the moving vehicle to the display apparatus 65 at the calculated timing.

Figure 7:
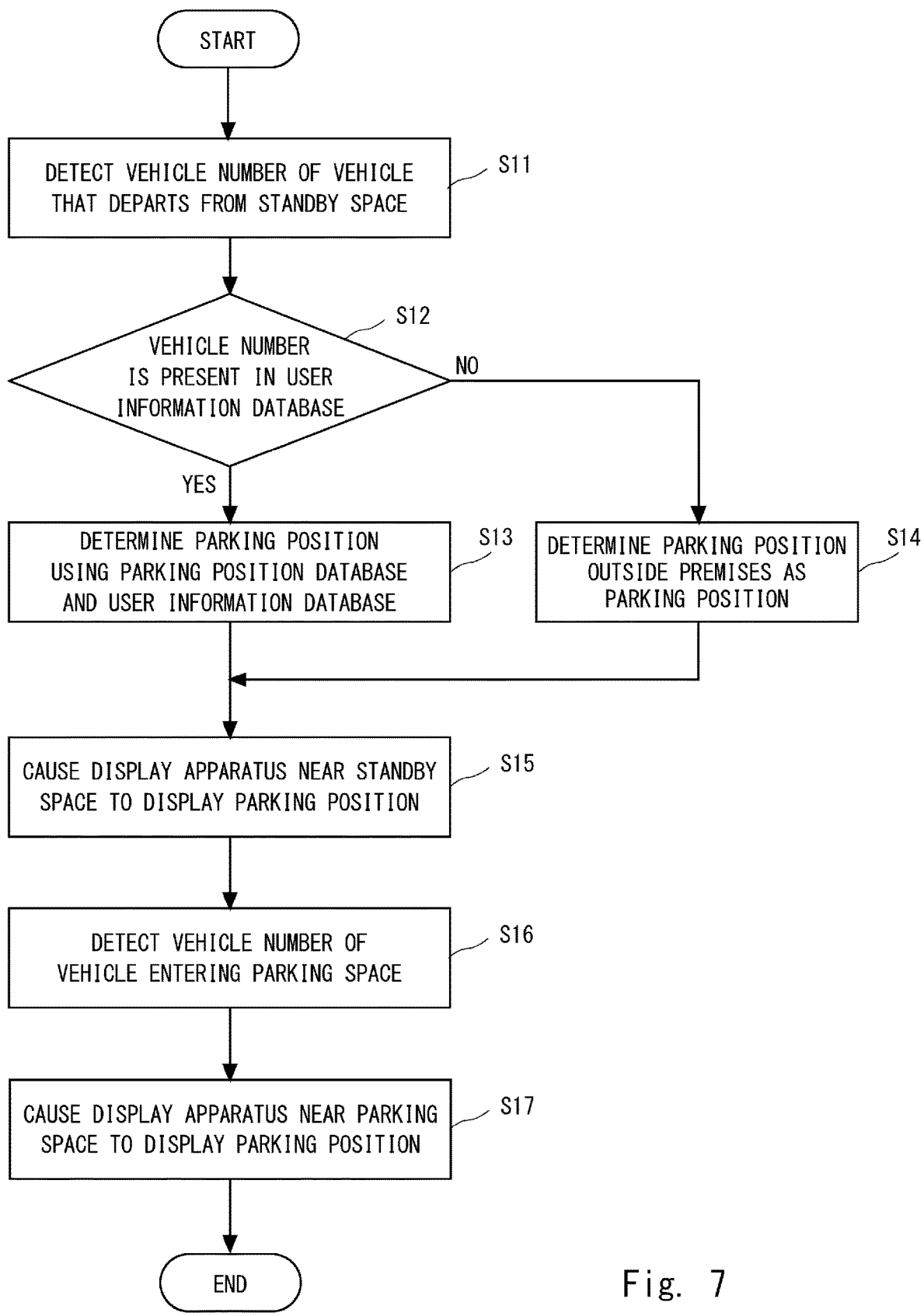
FIG. 7 is a flowchart showing a flow of processing for determining a parking position and processing for displaying the parking position according to the second example embodiment.

Next, a flow of processing for determining a parking position and processing for displaying the parking position according to the second example embodiment will be described with reference to FIG. 7. First, the detection unit 13 detects the vehicle number of a vehicle that departs from the standby space 30 (S11). The detection unit 13 may detect the vehicle number of a vehicle that departs from the standby space 30 using a result of detection by the parking position sensor 31 or a result of analysis of a captured image received from the camera that captures the standby space 30.

Next, the determination unit 14 determines whether or not the detected vehicle number is present in the user information database 55 (S12). When the determination unit 14 determines that the detected vehicle number is present in the user information database 55, the determination unit 14 determines a parking position of the vehicle using the parking position database 54 and the user information database 55 (S13). When the determination unit 14 determines that the detected vehicle number is not present in the user information database 55, the determination unit 14 determines a parking position outside the premises as the parking position of the vehicle (S14).

After the processing in Steps S13 and S14, the display control unit 52 causes the display apparatus 64 near the standby space to display the parking position of the vehicle having the vehicle number detected in Step S11 (S15). Specifically, when the parking position is determined in Step S13, the display control unit 52 transmits to the display apparatus 64 information for instructing the vehicle to move to the parking space 40. Further, when the parking position is determined in Step S14, the display control unit 52 transmits to the display apparatus 64 information for instructing the vehicle to move to the parking space outside the premises.

Then, the detection unit 13 detects the vehicle number of the vehicle entering the parking space 40 by analyzing the captured image received from the camera 62 (S16). Then, the display control unit 52 causes the display apparatus 65 near the parking space 40 to display the parking position of the vehicle having the vehicle number detected in Step 16 (S17).

Figure 8:
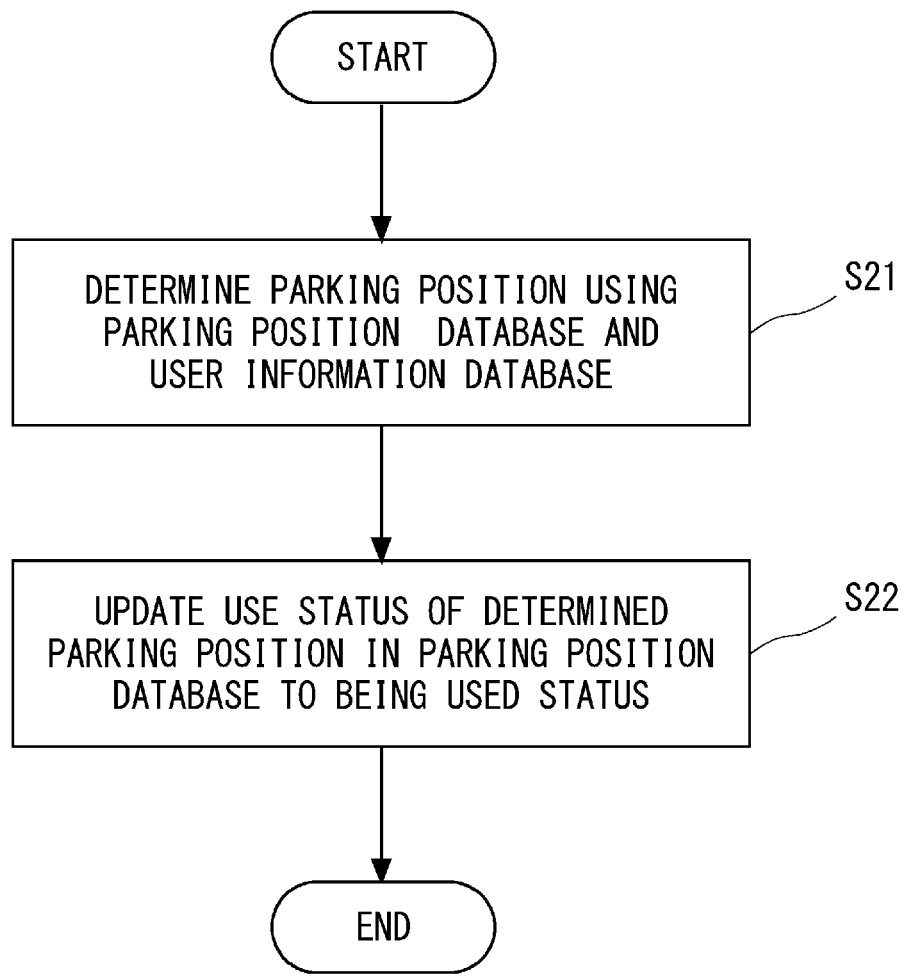
FIG. 8 is a flowchart showing a flow of processing for updating the parking position database according to the second example embodiment.

Next, a flow of processing for updating the parking position database 54 according to the second example embodiment will be described with reference to FIG. 8. First, the determination unit 14 determines a parking position of the vehicle having the vehicle number detected by the detection unit 13 using the parking position database 54 and the user information database 55 (S21). Next, the parking lot management unit 11 updates the use status of the determined parking position in the parking position database 54 to a being used status (S22).

Figure 9:
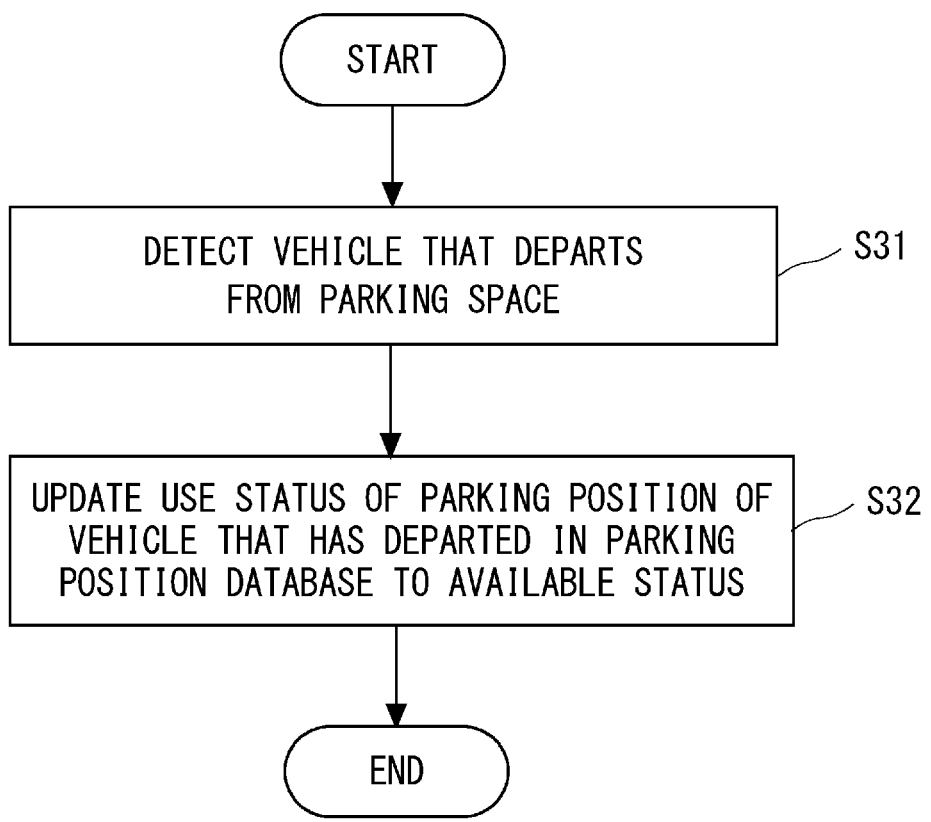
FIG. 9 is a flowchart showing a flow of processing for updating the parking position database according to the second example embodiment.

Next, a flow of processing for updating the parking position database 54 according to the second example embodiment will be described with reference to FIG. 9. First, the detection unit 13 detects the vehicle number of the vehicle that departs from the parking space 40 (S31). Then, the parking lot management unit 11 updates the use status of the parking position of the vehicle that has departed in the parking position database 54 to an available status (S32).

As described above, the parking lot management apparatus 51 according to the second example embodiment can determine a parking position of the vehicle in accordance with facility use information of a user who uses a rental car place. Thus, the rental car place can improve the degree of satisfaction of the user and further can manage vehicles efficiently.

Further, in the second example embodiment, a description has been given of an example of a case in which a driver of a vehicle recognizes the destination of the vehicle by visually recognizing the display apparatuses 64 and 65. For example, the display control unit 52 may cause devices other than the display apparatuses 64 and 65 to display the destination of the vehicle. For example, the display control unit 52 may transmit destination information to the vehicle through the communication unit 53 and cause a car navigation system in the vehicle to display the destination of the vehicle. Alternatively, the display control unit 52 may transmit destination information of the vehicle to a mobile terminal owned by a driver or a passenger in the vehicle through the communication unit 53 and cause the display unit of the mobile terminal to display the destination of the vehicle.

Figure 10:
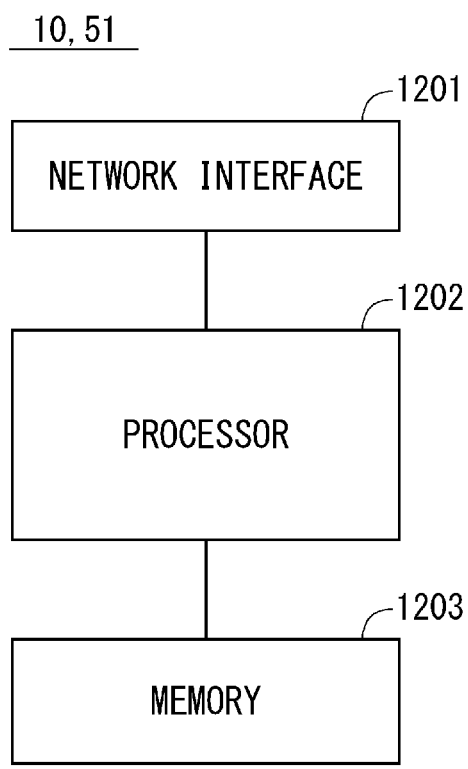
FIG. 10 is a diagram showing a configuration diagram of the parking lot management apparatus according to each of the example embodiments.

FIG. 10 is a block diagram showing an example of a configuration of the parking lot management apparatus 10 or the parking lot management apparatus 51 (hereafter referred to as the parking lot management apparatus 51 and the like). Referring to FIG. 10, the parking lot management apparatus 51 and the like include a network interface 1201, a processor 1202, and a memory 1203. The network interface 1201 may be used to communicate with another network node. The network interface 1201 may include, for example, a network interface card (NIC) that is in conformity with IEEE 802.3 series.

The processor 1202 loads software (a computer program) from the memory 1203 and executes the loaded software, thereby performing processing of the parking lot management apparatus 51 and the like described with reference to the flowcharts in the above example embodiments. The processor 1202 may be, for example, a microprocessor, an MPU, or a CPU. The processor 1202 may include a plurality of processors.

The memory 1203 is composed of a combination of volatile memory and non-volatile memory. The memory 1203 may include storage located away from the processor 1202. In this case, the processor 1202 may access the memory 1203 through an Input/Output (I/O) interface (not shown).

In the example of FIG. 10, the memory 1203 is used to store software modules. The processor 1202 can perform processing of the parking lot management apparatus 51 and the like described in the above example embodiments by loading these software modules from the memory 1203 and executing them.

As described with reference to FIG. 10, each of the processors included in the parking lot management apparatus 51 and the like in the above-described example embodiments executes one or more programs including instructions for causing a computer to perform the algorithm described with reference to the drawings.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described example embodiments and may be changed as appropriate without departing from the scope and spirit of the present disclosure.

Although the present invention has been described above with reference to example embodiments, the present invention is not limited to the above-described example embodiments. Various changes that can be understood by those skilled in the art can be made to the configuration and details of the present invention within the scope of the invention.

This application is based upon and claims the benefit of priority from Japanese patent application No. 2021-042935, filed on Mar. 16, 2021, the disclosure of which is incorporated herein in its entirety by reference.

REFERENCE SIGNS LIST

10 PARKING LOT MANAGEMENT APPARATUS
11 PARKING LOT MANAGEMENT UNIT
12 USER INFORMATION MANAGEMENT UNIT
13 DETECTION UNIT
14 DETERMINATION UNIT
20 CAR WASH SPACE
30 STANDBY SPACE
31 PARKING POSITION SENSOR
40 PARKING SPACE
50 PROCEDURE OFFICE
51 PARKING LOT MANAGEMENT APPARATUS
52 DISPLAY CONTROL UNIT
53 COMMUNICATION UNIT
54 PARKING POSITION DATABASE
55 USER INFORMATION DATABASE
61 CAMERA
62 CAMERA
63 CAMERA
64 DISPLAY APPARATUS
65 DISPLAY APPARATUS

What is claimed is:

1. A parking lot management apparatus comprising:
at least one memory storing instructions, and
at least one processor configured to execute the instructions to:
manage a use status of a parking lot in a facility;
associate facility use information of a user who uses the facility with a vehicle number of a vehicle used by the user and manage the associated information;
detect a first vehicle number of a first vehicle moving in the parking lot; and
determine, from among a plurality of parking positions that are not currently being used, a parking position of the first vehicle based on the facility use information associated with the first vehicle number so that a moving distance of the user moving in the facility is reduced, wherein
the facility use information includes at least a scheduled rental date and time of a vehicle to be rented to the user, and
the at least one processor is further configured to execute the instructions to determine the parking position of the first vehicle so that the moving distance of the user is reduced as the scheduled rental date and time of the first vehicle becomes closer to a current time.

2. The parking lot management apparatus according to claim 1, wherein the at least one processor is further configured to execute the instructions to cause a display to display the parking position of the first vehicle, the display being visually recognized by a driver who drives the first vehicle.

3. The parking lot management apparatus according to claim 2, wherein the at least one processor is further configured to execute the instructions to cause the display to display the parking position of the first vehicle when a notification that the first vehicle is detected is received from a sensor configured to detect whether or not a vehicle is present at a specific position.

4. The parking lot management apparatus according to claim 2, wherein the at least one processor is further configured to execute the instructions to:
cause the display to display an area including the parking position of the first vehicle when a plurality of the sensors are installed in the parking lot and a result of the detection of the first vehicle is received from a first sensor, and
cause the display to display the parking position of the first vehicle when a result of the detection of the first vehicle is received from a second sensor.

5. The parking lot management apparatus according to claim 1, wherein the at least one processor is further configured to execute the instructions to;
detect a second vehicle number of a second vehicle moving to an outside of the parking lot, and
manage a parking position where the second vehicle has been parked as a parking position that is not currently being used.

6. The parking lot management apparatus according to claim 1, wherein the at least one processor is further configured to execute the instructions to determine the parking position of the first vehicle based on the facility use information and climate information.

7. A parking lot management method comprising:
managing a use status of a parking lot in a facility;
associating facility use information of a user who uses the facility with a vehicle number of a vehicle used by the user and managing the associated information, the facility use information including at least a scheduled rental date and time of a vehicle to be rented to the user;
detecting a first vehicle number of a first vehicle moving in the parking lot; and
determining, from among a plurality of parking positions that are not currently being used, a parking position of the first vehicle based on the facility use information associated with the first vehicle number so that a moving distance of the user moving in the facility is reduced as the scheduled rental date and time of the first vehicle becomes closer to a current time.

8. The parking lot management method according to claim 7, wherein information about the determined parking position of the first vehicle is transmitted to a display that is visually recognized by a driver who drives the first vehicle, and the display is caused to display the parking position of the first vehicle.

9. A non-transitory computer readable medium storing a program for causing a computer to:
manage a use status of a parking lot in a facility;
associate facility use information of a user who uses the facility with a vehicle number of a vehicle used by the user and manage the associated information, the facility use information including at least a scheduled rental date and time of a vehicle to be rented to the user;
detect a first vehicle number of a first vehicle moving in the parking lot; and determine, from among a plurality of parking positions that are not currently being used, a parking position of the first vehicle based on the facility use information associated with the first vehicle number so that a moving distance of the user moving in the facility is reduced as the scheduled rental date and time of the first vehicle becomes closer to a current time.

* * * * *